(12) United States Patent
Toyota et al.

(10) Patent No.: US 9,899,688 B2
(45) Date of Patent: Feb. 20, 2018

(54) FUEL CELL

(71) Applicant: HONDA MOTOR CO., LTD., Minato-Ku, Tokyo (JP)

(72) Inventors: Shohei Toyota, Utsunomiya (JP); Shuhei Goto, Utsunomiya (JP); Ryu Okano, Utsunomiya (JP); Hiroaki Ota, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 135 days.

(21) Appl. No.: 14/861,144

(22) Filed: Sep. 22, 2015

(65) Prior Publication Data

US 2016/0093899 A1 Mar. 31, 2016

(30) Foreign Application Priority Data

Sep. 26, 2014 (JP) ................. 2014-196456
Sep. 4, 2015 (JP) ................. 2015-174739

(51) Int. Cl.
*H01M 8/0247* (2016.01)
*H01M 8/0267* (2016.01)

(52) U.S. Cl.
CPC ....... *H01M 8/0247* (2013.01); *H01M 8/0267* (2013.01)

(58) Field of Classification Search
None
See application file for complete search history.

(56) References Cited

U.S. PATENT DOCUMENTS

| 7,732,079 B2 * | 6/2010 | Wakahoi | H01M 8/0247 429/158 |
| 2013/0252130 A1 * | 9/2013 | Ishida | H01M 8/04007 429/482 |

FOREIGN PATENT DOCUMENTS

| JP | 11-339828 A | 12/1999 |
| JP | 2000-223141 A | 8/2000 |
| JP | 2002-367649 A | 12/2002 |
| JP | 2003-115304 A | 4/2003 |
| JP | 2005-267959 A | 9/2005 |
| JP | 2006-024411 A | 1/2006 |
| JP | 2007-179876 A | 7/2007 |
| JP | 4566588 B2 | 10/2010 |

* cited by examiner

*Primary Examiner* — Jonathan Crepeau
(74) *Attorney, Agent, or Firm* — Carrier Blackman & Associates, P.C.; William D. Blackman; Jingli Wang

(57) ABSTRACT

Provided is a fuel cell including a plurality of stacked unit cells, each including a membrane-electrode assembly and a separator stacked on the membrane-electrode assembly. The separator includes a separator plate that overlaps the membrane-electrode assembly when seen from a stacking direction, a first terminal portion configured to protrude from the separator plate toward an outer side in a plane direction, a plate covering portion configured to cover an outer peripheral edge of the separator plate, and a terminal covering portion configured to be formed integrally with the plate covering portion and covers the first terminal portion. A plurality of the first terminal portions, which are adjacent to each other in the stacking direction, include offset portions which shift from each other when seen from the stacking direction, and are covered with the terminal covering portion.

7 Claims, 6 Drawing Sheets

FUEL CELL

CROSS REFERENCE TO RELATED APPLICATIONS

Priority is claimed on Japanese Patent Application No. 2014-196456, filed on Sep. 26, 2014, and Japanese Patent Application No. 2015-174739, filed on Sep. 4, 2015, the contents of which are incorporated herein by reference.

BACKGROUND OF THE INVENTION

Field of the Invention
The present invention relates to a fuel cell.
Description of Related Art
Examples of a fuel cell that is mounted on a vehicle and the like include a fuel cell that is used as a fuel cell stack in which a plurality of unit cells is stacked. Each of the unit cells includes a membrane-electrode assembly (hereinafter, simply referred to as "MEA") in which a solid polymer electrolyte membrane is interposed between an anode electrode and a cathode electrode, and a separator that is stacked on the MEA (for example, refer to Japanese Patent No. 4566588).

In the above-described fuel cell, hydrogen gas is supplied to the anode electrode as fuel gas, and air is supplied to the cathode electrode as oxidant gas. According to this, a hydrogen ion, which occurs in the anode electrode due to a catalytic reaction, is transmitted through the solid polymer electrolyte membrane and moves to the cathode electrode. In the cathode electrode, the hydrogen ion causes an electrochemical reaction with oxygen in air, and thus power generation is carried out.

In this kind of fuel cell, a terminal portion protrudes from the separator. In the fuel cell, a voltage between the terminal portions (for each MEA) is detected to control a power generation state of the fuel cell.

In addition, recently, there is a known configuration in which the terminal portion is provided for each of pluralities of separators so as to achieve simplification and the like. In this case, a voltage between the pluralities of separators (for the pluralities of MEAs) is detected.

SUMMARY OF THE INVENTION

However, in the configuration of detecting the voltage between the pluralities of separators as described above, for example, it is difficult to detect the voltage for each MEA during maintenance of the fuel cell due to failure and the like. According to this, it is difficult to specify a failure site only with the configuration of detecting the voltage between the pluralities of separators.

In contrast, it is possible to consider a configuration in which a spare terminal portion, which is used during maintenance, is provided to a separator other than a separator provided with the terminal portion among the separators.

Accordingly, aspects of the invention have been made in consideration of the above-described circumstances, and an object thereof is to provide a fuel cell capable of achieving low cost and of improving maintenance properties.

(1) To accomplish the above-described object, according to an aspect of the invention, there is provided a fuel cell including a plurality of stacked unit cells, each including a membrane-electrode assembly and a separator that is stacked on the membrane-electrode assembly. The separator includes a separator plate that overlaps the membrane-electrode assembly when seen from a stacking direction, a first terminal portion configured to protrude from the separator plate toward an outer side in a plane direction, a plate covering portion configured to cover an outer peripheral edge of the separator plate, and a terminal covering portion configured to be formed integrally with the plate covering portion and covers the first terminal portion. A plurality of the first terminal portions, which are adjacent to each other in the stacking direction, include offset portions which shift from each other when seen from the stacking direction, and are covered with the terminal covering portion.

(2) In the fuel cell, a weakened portion, at which the terminal covering portion is capable of being fractured from the plate covering portion, may be formed between the terminal covering portion and the plate covering portion.

(3) In the fuel cell, each of the unit cells may include two separators, two membrane-electrode assemblies which are disposed between the two separators, and an intermediate separator that is disposed between the two membrane-electrode assemblies.

(4) In the fuel cell, a coolant flow passage through which a coolant flows may be defined between a separator of one of the unit cells and a separator of another one of the unit cells which is adjacent to the one unit cell, and the first terminal portion of the separator of the one unit cell, and the first terminal portion of the separator of the another unit cell may partially overlap each other when seen from the stacking direction.

(5) In the fuel cell, the intermediate separator may be provided with a second terminal portion, which is exposed to an outer side, at a position not overlapping the first terminal portion of the separator when seen from the stacking direction.

(6) In the fuel cell, a voltage detection device, which comes into contact with the plurality of first terminal portions adjacent to each other in the stacking direction and detects a voltage between the plurality of first terminal portions adjacent to each other in the stacking direction, may be interposed between the plurality of first terminal portions adjacent to each other in the stacking direction.

(7) According to another aspect of the invention, there is provided a fuel cell including a plurality of stacked unit cells, each including a membrane-electrode assembly and a separator stacked on the membrane-electrode assembly. The separator includes a separator plate that overlaps the membrane-electrode assembly when seen from a stacking direction, a first terminal portion configured to protrude from the separator plate toward an outer side in a plane direction, a plate covering portion configured to cover an outer peripheral edge of the separator plate, and a terminal covering portion configured to be formed integrally with the plate covering portion and covers the first terminal portion. A weakened portion, at which the terminal covering portion is capable of being fractured from the plate covering portion, is formed between the terminal covering portion and the plate covering portion.

According to the aspect of (1), the terminal covering portion and the plate covering portion are integrally formed, and thus it is possible to achieve low cost, and it is possible to secure insulating properties of the first terminal portion during not in use.

Particularly, the first terminal portions adjacent to each other are provided with the offset portions which shift from each other when seen from the stacking direction, and thus it is possible to grip a portion of the terminal covering portion, which covers the offset portions, with a tool and the like during maintenance and the like. According to this, the terminal covering portion is easily fractured from the plate covering portion, and thus it is possible to simply remove the terminal covering portion from the first terminal portion. As a result, it is possible to improve maintenance properties.

According to the aspect of (2), the weakened portion is formed between the terminal covering portion and the plate covering portion, and thus it is possible to fracture only the terminal covering portion from the plate covering portion in a simple and reliable manner. As a result, it is possible to improve the maintenance properties, and it is possible to suppress peeling-off and the like of the plate covering portion during removal of the terminal covering portion from the first terminal portion.

According to the aspect of (3), even in a case where the unit cell includes two membrane-electrode assemblies, it is possible to detect a voltage for each of the membrane-electrode assemblies through the first terminal portion of a separator that is disposed on an outer side of the membrane-electrode assemblies during maintenance and the like. According to this, it is possible to achieve simplification of a configuration, and it is possible to improve the maintenance properties.

According to the aspect of (4), the coolant flow passage is defined between one of the unit cells and another one of the unit cells, and thus a voltage between the separator in the one unit cell and the separator in the another unit cell becomes same. According to this, it is easy for a voltage detection device to be brought into contact with both of the first terminal portions through insertion of the voltage detection device between first terminal portions of the separator of the one unit cell and the separator of the another unit cell during maintenance and the like. As a result, it is possible to provide excellent workability.

According to the aspect of (5), the second terminal portion of the intermediate separator can be used as a terminal for detecting a voltage (voltage of a unit cell) of the two membrane-electrode assemblies during operation of the fuel cell and the like. In this case, the second terminal portion is disposed at a position not overlapping the first terminal portion of the separator when seen from the stacking direction, and thus it is possible to suppress interference with the first terminal portion, and it is possible to connect the voltage detection device to the second terminal portion. According to this, it is possible to control a power generation state of the fuel cell with accuracy.

According to the aspect of (6), it is possible to detect a voltage between the first terminal portions (between the separators) only with insertion of the voltage detection device between the first terminal portions during maintenance and the like, and thus it is possible to improve the maintenance properties.

According to the aspect of (7), the terminal covering portion is formed integrally with the plate covering portion, and thus it is possible to achieve low cost, and it is possible to secure insulating properties of the first terminal portion during not in use.

Particularly, the weakened portion is formed between the terminal covering portion and the plate covering portion, and thus it is possible to fracture only the terminal covering portion from the plate covering portion in a simple and reliable manner. As a result, it is possible to improve the maintenance properties, and it is possible to suppress peeling-off and the like of the plate covering portion during removal of the terminal covering portion from the first terminal portion.

DETAILED DESCRIPTION OF THE INVENTION

Hereinafter, an embodiment of the invention will be described with reference to the accompanying drawings.

Fuel Cell

Figure 1:
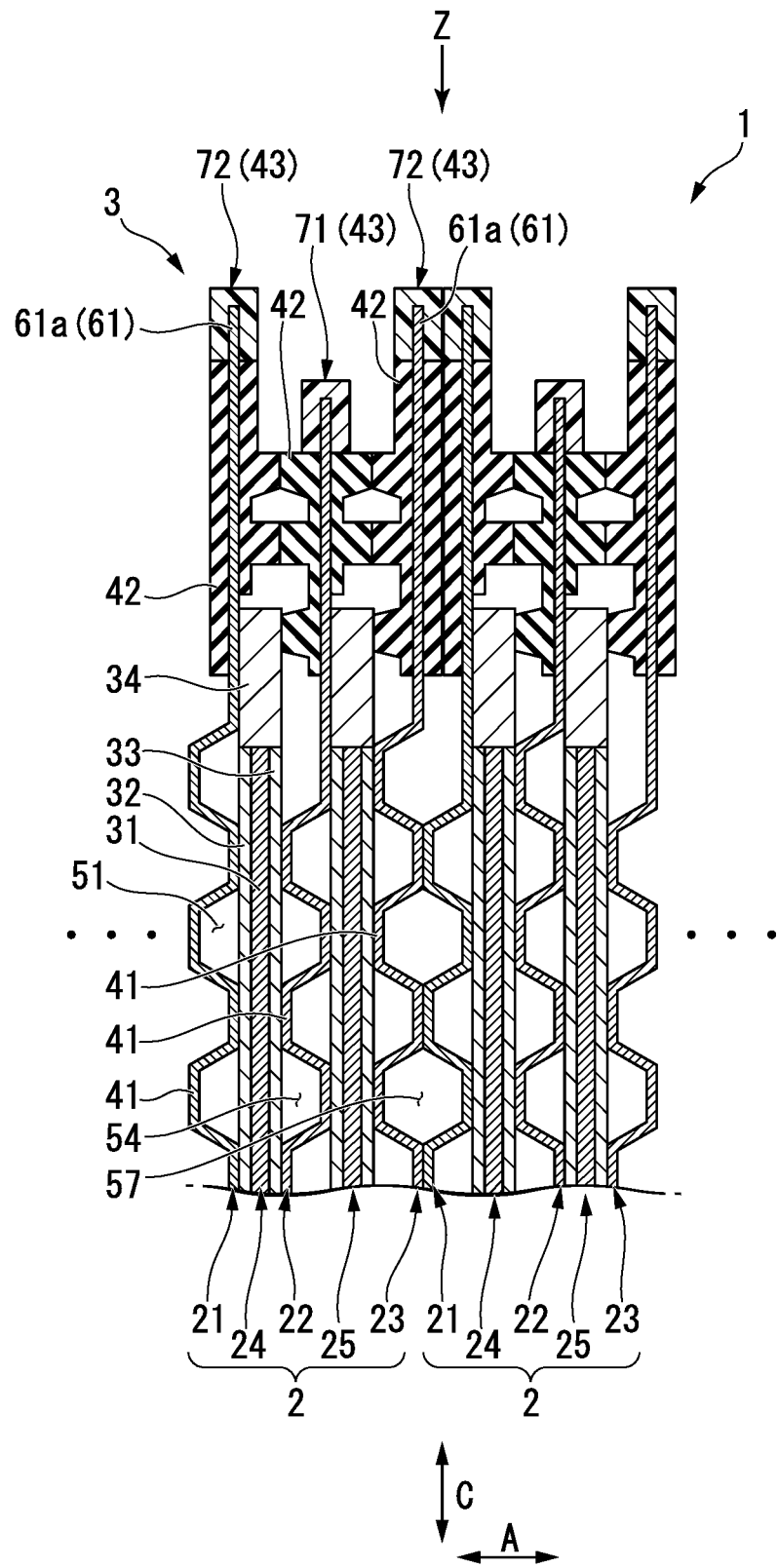
FIG. 1 is a cross-sectional view of a fuel cell in this embodiment.
Figure 2:
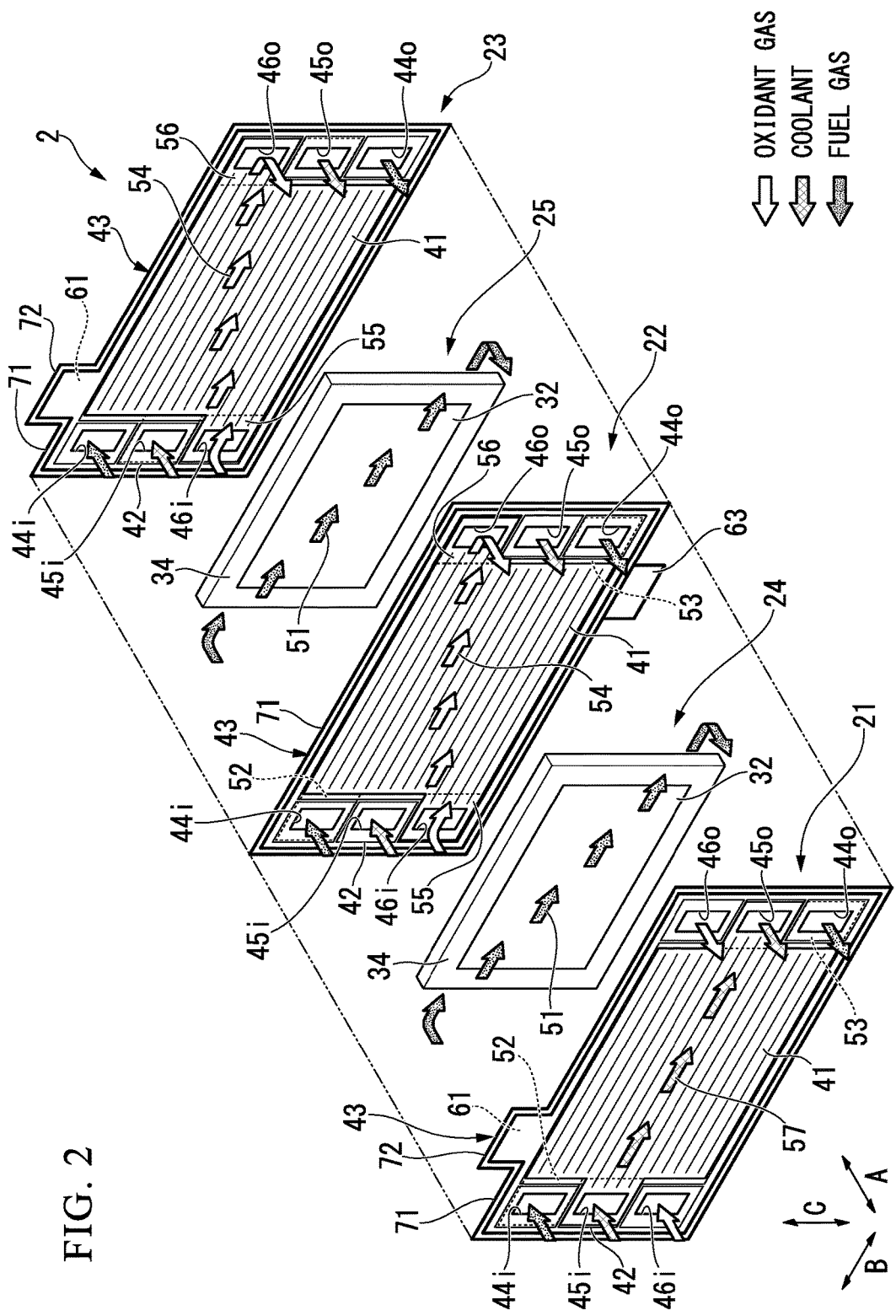
FIG. 2 is an exploded perspective view of a unit cell.

FIG. 1 is a cross-sectional view of a fuel cell 1 of this embodiment. FIG. 2 is an exploded perspective view of a unit cell 2.

As illustrated in FIGS. 1 and 2, the fuel cell 1 of this embodiment is mounted in a motor room or under a floor of a vehicle (not illustrated). For example, the fuel cell 1 is used to supply electric power to a drive motor and the like. In addition, for example, the fuel cell 1 of this embodiment is mounted on a vehicle in such a manner that a direction of an arrow A in the drawing is along the width direction of a vehicle body, a direction of an arrow B is along a back and forth direction of the vehicle body, and a direction of an arrow C is along the vertical direction of the vehicle body.

The fuel cell 1 mainly includes a fuel cell stack 3 in which a plurality of unit cells 2 are stacked in the thickness direction (A direction), and a pair of end plates (not illustrated) which sandwiches the fuel cell stack 3 from both sides in the A direction.

Unit Cell

For example, each of the unit cells 2 includes three separators 21 to 23, and membrane-electrode assemblies (a first MEA 24 and a second MEA 25), each being sandwiched between the separators 21 to 23. Each of the MEA 24 and the MEA 25 includes a solid polymer electrolyte membrane 31, an anode electrode 32 and a cathode electrode 33 which sandwich the solid polymer electrolyte membrane 31 from both sides in the A direction, a frame body 34 that surrounds the outer periphery of the solid polymer electrolyte membrane 31, the anode electrode 32, and the cathode electrode 33.

As illustrated in FIG. 1, for example, the solid polymer electrolyte membrane 31 is formed from a material obtained by impregnating a perfluorosulfonic acid polymer with water.

The anode electrode 32 and the cathode electrode 33 include a gas diffusion layer formed from carbon paper and the like, and an electrode catalyst layer formed by uniformly applying porous carbon particles, on which a platinum alloy is carried on a surface, onto a surface of the gas diffusion layer.

As illustrated in FIGS. 1 and 2, for example, the frame body 34 is constituted by a material such as a resin material and the like which have insulating properties. An inner peripheral surface of the frame body 34 is joined to the outer peripheral surface of the solid polymer electrolyte membrane 31, the anode electrode 32, and the cathode electrode 33. The thickness of the frame body 34 is set to be the same as the total thickness of the solid polymer electrolyte membrane 31, the anode electrode 32, and the cathode electrode 33. Accordingly, in an example illustrated in the drawing, one surface of the frame body 34 is flush with one surface of the anode electrode 32. The other surface of the frame body 34 is flush with one surface of the cathode electrode 33.

Separator

The separators 21 to 23 of the unit cell 2 represent a first separator (separator) 21 that faces the anode electrode 32 of the first MEA 24, a second separator (intermediate separator) 22 that is disposed between the MEA 24 and the MEA 25, and a third separator (separator) 23 that faces the cathode electrode 33 of the second MEA 25. In addition, regarding the separators 21 to 23, the same reference numeral will be given to the same configuration and the description thereof will be collectively made in the following description.

Each of the separators 21 to 23 includes a separator plate 41, a seal member 42, and a covering member 43. The separator plate 41 overlaps the MEA 24 and the MEA 25 when seen from the A direction. The seal member 42 seals between the separator plate 41 and each of the MEA 24 and the MEA 25. The covering member 43 surrounds an outer peripheral edge of the separator plate 41.

As illustrated in FIG. 2, for example, the separator plate 41 is constituted by a metallic material having a thin plate shape. The separator plate 41 has a rectangular shape in which the B direction in a plan view seen from the A direction is set as a longitudinal direction.

On one end of the separator plate 41 in the B direction, a fuel gas inlet communication hole 44$i$, a coolant inlet communication hole 45$i$, and an oxidant gas inlet communication hole 46$i$ are arranged in the C direction. Fuel gas (for example, hydrogen and the like), which is supplied into a fuel gas flow passage 51 to be described later, flows through the inside of the fuel gas inlet communication hole 44$i$. A coolant (for example, pure water, ethylene glycol, and the like), which is supplied into a coolant flow passage 57 to be described later, flows through the inside of the coolant inlet communication hole 45$i$. Oxidant gas (for example, air and the like), which is supplied into an oxidant gas flow passage 54 to be described later, flows through the inside of the oxidant gas inlet communication hole 46$i$. The communication holes 44$i$ to 46$i$ penetrate the separator plate 41 in the A direction, and communicate with corresponding communication holes 44$i$ to 46$i$ of a separator plate 41 that is adjacent to the above-described separator plate 41 in the A direction.

On the other hand, on the other end of the separator plate 41 in the B direction, a fuel gas outlet communication hole 44$o$, a coolant outlet communication hole 45$o$, and an oxidant gas outlet communication hole 46$o$ are arranged in the C direction. The fuel gas, which is consumed in the fuel gas flow passage 51, flows through the inside of the fuel gas outlet communication hole 44$o$. The coolant, which flows in the coolant flow passage 57, flows through the inside of the coolant outlet communication hole 45$o$. The oxidant gas, which is consumed in the oxidant gas flow passage 54, flows through the inside of the oxidant gas outlet communication hole 46$o$. The communication holes 44$o$ to 46$o$ penetrate the separator plate 41 in the A direction, and communicate with corresponding communication holes 44$o$ to 46$o$ of a separator plate 41 that is adjacent to the above-described separator plate 41 in the A direction.

In the example illustrated in the drawing, in the separator plate 41, the fuel gas inlet communication hole 44$i$ and the fuel gas outlet communication hole 44$o$ are formed at diagonal positions, and the oxidant gas inlet communication hole 46$i$ and the oxidant gas outlet communication hole 46$o$ are formed at diagonal positions. In addition, in the separator plate 41, the coolant inlet communication hole 45$i$ is formed at a portion that is located between the fuel gas inlet communication hole 44$i$ and the oxidant gas inlet communication hole 46$i$. In the separator plate 41, the coolant outlet communication hole 45$o$ is formed at a portion that is located between the fuel gas outlet communication hole 44$o$ and the oxidant gas outlet communication hole 46$o$.

The central portion of each of the separator plates 41 is formed in a concavo-convex shape through press forming and the like. In addition, the surfaces of the separator plates 41, which face the MEA 24 or 25, define linear reaction gas flow passages (the fuel gas flow passage 51 and the oxidant gas flow passage 54) between the separator plates 41 and the MEA 24 or 25.

Specifically, in the surface, which faces the anode electrode 32, of each of the separator plates 41 of the first separator 21 and the second separator 22, the fuel gas flow passage 51 is formed between the separator plate 41 and the anode electrode 32 of the MEA 24 or 25. The fuel gas flow passage 51 communicates with the fuel gas inlet communication hole 44$i$ and the fuel gas outlet communication hole 44$o$ through an inlet side connection flow passage 52 and an outlet side connection flow passage 53, respectively. The fuel gas flow passage 51 allows the fuel gas, which flows through the fuel gas inlet communication hole 44$i$, to flow along the anode electrode 32 of the MEA 24 and the MEA 25, and allows the fuel gas, which is consumed and used in the anode electrode 32, to be discharged to the fuel gas outlet communication hole 44$o$.

In addition, in the surface, which faces the cathode electrode 33, of each of the separator plates 41 of the second separator 22 and the third separator 23, the oxidant gas flow passage 54 is formed between the separator plate 41 and the cathode electrode 33 of the MEA 24 or 25. The oxidant gas flow passage 54 communicates with the oxidant gas inlet communication hole 46$i$ and the oxidant gas outlet communication hole 46$o$ through an inlet side connection flow passage 55 and an outlet side connection flow passage 56, respectively. The oxidant gas flow passage 54 allows the oxidant gas, which flows through the oxidant gas inlet communication hole 46$i$, to flow along the cathode electrode 33 of the MEA 24 or 25, and allows the oxidant gas, which is consumed and used in the cathode electrode 33, to be discharged to the oxidant gas outlet communication hole 46$o$.

As illustrated in FIG. 1, the fuel cell stack 3 is configured in such a manner that the first separator 21 of one of the unit cells 2 and the third separator 23 of another one of the unit cells 2, which is adjacent to the one unit cell 2, are stacked in the A direction in a state of overlapping each other. In addition, the coolant flow passage 57 is defined between the separator plate 41 of the first separator 21 of the one unit cell 2 and the separator plate 41 of the third separator 23 of the another unit cell 2.

The coolant flow passage 57 allows the coolant, which flows through the coolant inlet communication hole 45$i$, to flow along the separator plate 41. The coolant is discharged from the coolant outlet communication hole 45$o$ after heat exchange with the separator plate 41.

As described above, according to this embodiment, the gas flow passages 51 and 54 for the reaction gas are formed in the surfaces of the first separator 21 and the third separator 23, which face the MEA 24 and the MEA 25 and are positioned on both sides in the A direction, among the separators 21 to 23. The coolant flow passage 57 is formed in the surfaces of the first separator 21 and the third separator 23, which face sides opposite to the MEA 24 and the MEA 25 and are positioned on both sides in the A direction, among the separators 21 to 23. On the other hand, the gas flow passages 51 and 54 for the reaction gas are formed in both surfaces of the second separator 22, which is located between the MEA 24 and the MEA 25, among the separators 21 to 23.

Here, in the separator plates 41 of the first separator 21 and the third separator 23, a spare terminal portion 61 is formed integrally with each of the separator plates 41. Each spare terminal portion 61 is configured to detect a voltage between the separators 21 to 23 (voltage for each of the MEA 24 and the MEA 25) during maintenance and the like. Two spare terminal portions 61 are formed in the same shape and the same size. In the separator plates 41 of the first separator 21 and the third separator 23, the spare terminal portions 61 protrude from long side portions on one side toward an outer side in the C direction. However, the spare terminal portions 61 are not limited to the same shape and the same size, and there is no problem as long as an overlapping portion 61a to be described is provided.

Figure 3:
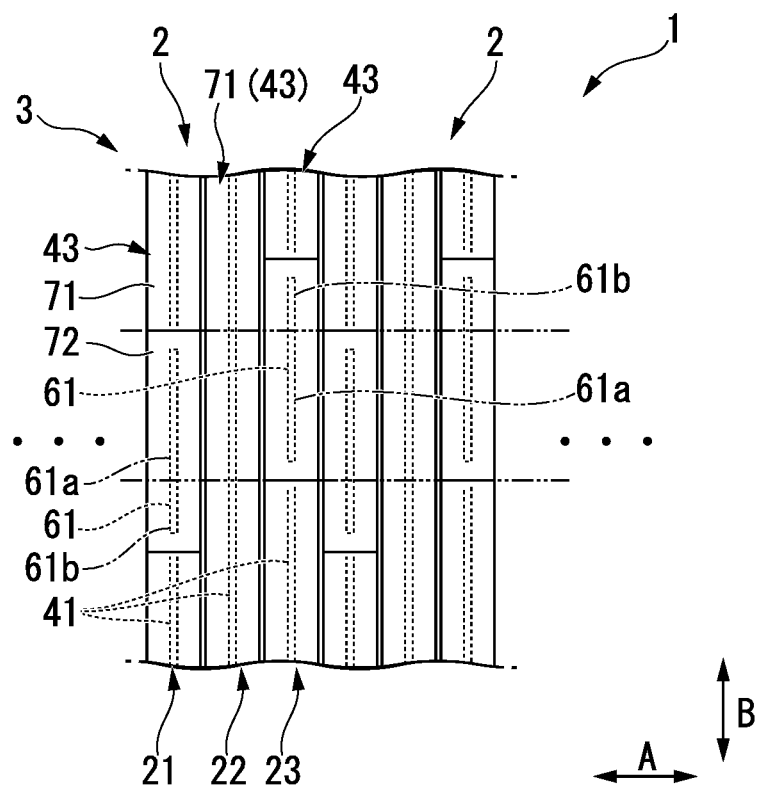
FIG. 3 is a view taken in the direction of an arrow Z in FIG. 1.
Figure 4:
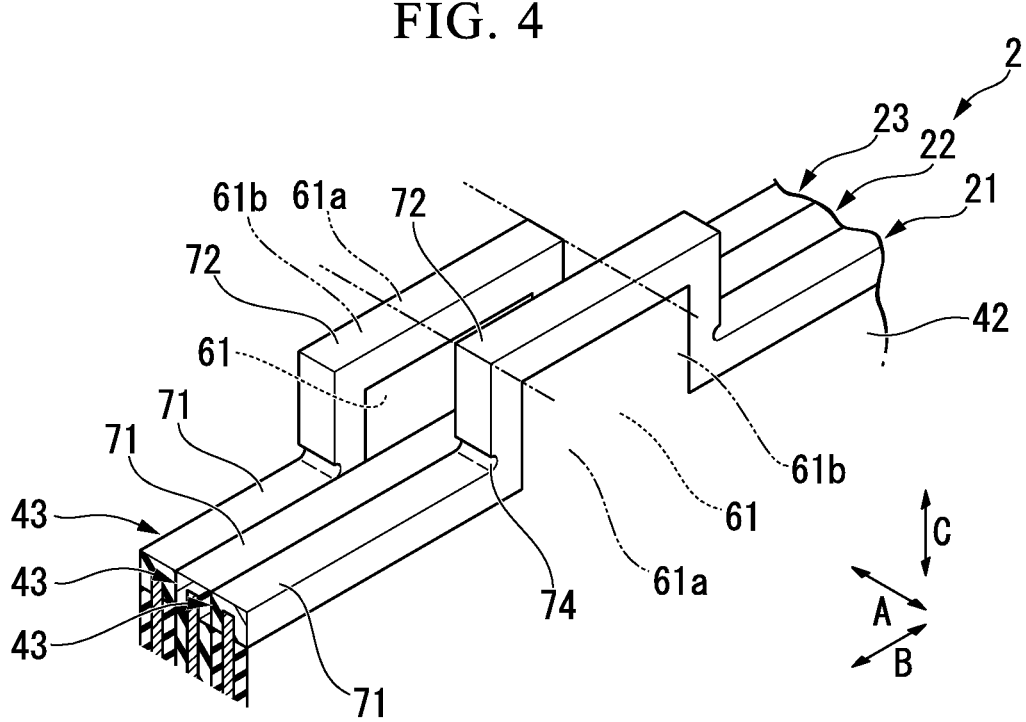
FIG. 4 is a partial perspective view of the unit cell.

FIG. 3 is a view taken in the direction of an arrow Z in FIG. 1. FIG. 4 is a partial perspective view of the unit cell 2.

As illustrated in FIGS. 2 to 4, in the separator plates 41, the spare terminal portions 61 are disposed at positions which shift from each other in the B direction in a plan view when seen from the A direction. Specifically, each of the spare terminal portions 61 includes an overlapping portion 61a that overlaps an adjacent spare terminal portion 61 in a plan view, and an offset portion 61b which protrudes toward an outer side from the overlapping portion 61a in the B direction and does not overlap the adjacent spare terminal portion 61 in a plan view. In addition, examples of the adjacent spare terminal portions 61 include spare terminal portions 61 of the first separator 21 and the third separator 23 of the same unit cell 2, and a spare terminal portion 61 of the first separator 21 of one of the unit cells 2 and a spare terminal portion 61 of the third separator 23 of another one of the unit cells 2.

In this case, in the spare terminal portion 61 of the first separator 21, the offset portion 61b is located on the other end side in the 13 direction with respect to the overlapping portion 61a. In addition, in the spare terminal portion 61 of the third separator 23, the offset portion 61b is located on one end side in the B direction with respect to the overlapping portion 61a. In this case, the center of the spare terminal portion 61 in the B direction is disposed in the overlapping portion 61a. In addition, in the example illustrated in the drawing, the length of the overlapping portion 61a in the B direction is set to be longer than the length of the offset portion 61b.

In addition, in the separator plate 41 of the second separator 22, an operation terminal portion 63 is formed integrally with the separator plate 41. The operation terminal portion 63 is configured to detect a voltage of the unit cell 2 during operation of the fuel cell 1 and the like. In the separator plate 41 of the second separator 22, the operation terminal portion 63 protrudes from a long side portion on the other side toward an outer side in the C direction. In addition, the operation terminal portion 63 is formed at positions, which overlap each other when seen from the A direction, between second separators 22 of adjacent unit cells 2. When an operation voltage detection device (not illustrated) is connected to the operation terminal portion 63, a voltage of the unit cell 2 is detected. That is, in the fuel cell 1 of this embodiment, the sum of voltages of two MEAs 24 and 25 (specifically, the sum of a voltage of the MEA 24 of one unit cell 2, and a voltage of the MEA 25 of another unit cell 2 that is adjacent to the one unit cell 2) is detected.

The seal member 42 is constituted by an elastically deformable material such as rubber. The seal member 42 covers an outer peripheral portion of the separator plate 41. In the seal member 42, a portion, which faces the frame body 34 of the MEA 24 and the MEA 25 on the A direction, comes into close contact with the frame body 34. According to this, the seal member 42 seals a gap between the separators 21 to 23, and the MEA 24 and the MEA 25, the communication holes 44i to 44o, and 44o to 46o, the reaction gas flow passages 51 and 52, and the coolant flow passage 57.

For example, the covering member 43 is constituted by a resin material having electrical insulating properties, and the like. The covering member 43 is formed in a frame shape. The covering member 43 is joined to the separator plate 41 through injection molding. In addition, the covering member 43 comes into close contact with the above-described seal member 42 with no gap. Specifically, the covering member 43 includes a plate covering portion 71 that surrounds an outer peripheral edge of the separator plate 41 over the entire periphery thereof, and a terminal covering portion 72 which is formed integrally with the plate covering portion 71 and covers the spare terminal portion 61. That is, in this embodiment, the operation terminal portion 63 further protrudes toward an outer side in the C direction in comparison to the covering member 43, and is exposed to the outside.

As illustrated in FIG. 4, the terminal covering portion 72 is formed in a C-shape that surrounds an outer peripheral edge of the spare terminal portion 61 in a plan view. Both ends of the terminal covering portion 72 extend to the plate covering portion 71 through a weakened portion 74 that is capable of being fractured.

The weakened portion 74 is formed in the covering member 43 at a boundary portion between the terminal covering portion 72 and the plate covering portion 71. The weakened portion 74 is formed with a smaller thickness in comparison to the terminal covering portion 72 and the plate covering portion 71. According to this, the terminal covering portion 72 can be removed from the spare terminal portion 61. In addition, in this embodiment, the weakened portion 74 has been described with reference to a case of being formed with a smaller thickness in comparison to the terminal covering portion 72 and the plate covering portion 71. However, there is no limitation thereto, and the weakened portion 74 may be formed into a perforation and the like.

In the fuel cell 1 configured as described above, the oxidant gas, which is supplied into the fuel cell stack 3, flows through the oxidant gas inlet communication hole 46i of each of the unit cells 2 along one direction (toward the third separator 23) in the A direction. The oxidant gas, which flows through the oxidant gas inlet communication hole 46i, passes through the inlet side connection flow passage 55 of the second separator 22 and the third separator 23, is introduced into the oxidant gas flow passage 54, and is supplied to the cathode electrode 33 of the MEA 24 and the MEA 25.

On the other hand, the fuel gas, which is supplied into the fuel cell stack 3, flows through the fuel gas inlet communication hole 44i along one direction in the A direction. The fuel gas, which flows through the fuel gas inlet communication hole 44i of each of the unit cells 2, passes through the inlet side connection flow passage 52 of the first separator 21 and the second separator 22, is introduced into the fuel gas flow passage 51, and is supplied to the anode electrode 32 of the MEA 24 and the MEA 25.

As a result, a hydrogen ion, which occurs in the anode electrode 32 through a catalytic reaction, is transmitted through the solid polymer electrolyte membrane 31, and moves to the cathode electrode 33. The hydrogen ion causes an electrochemical reaction with the oxidant gas at the cathode electrode 33, and power generation occurs.

Then, the oxidant gas, which is supplied for the power generation in the cathode electrode 33 and is consumed, passes through the outlet side connection flow passage 56, is introduced into the oxidant gas outlet communication hole 46o, and flows through the oxidant gas outlet communication hole 46o along the other direction (toward the first separator 21) in the A direction. Then, the oxidant gas, which is consumed, passes through a discharge passage (not illustrated) and is discharged to the outside of a vehicle.

On the other hand, the fuel gas, which is supplied for power generation in the anode electrode 32 and is consumed, passes through the outlet side connection flow passage 53, is introduced to the fuel gas outlet communication hole 44o, and flows through the fuel gas outlet communication hole 44o toward the other direction in the A direction. Then, the fuel gas, which is consumed, is mixed and diluted with the oxidant gas that is used by using a diluter (not illustrated), and is discharged to the outside of a vehicle.

In addition, a coolant, which is supplied into the fuel cell stack 3, flows through the coolant inlet communication hole 45i toward one direction in the A direction. The coolant, which flows through the coolant inlet communication hole 45i, is supplied to the coolant flow passage 57 between the unit cells 2, and heat exchange with the unit cells 2 is carried out. Then, the coolant is introduced into the coolant outlet communication hole 45o, flows through the inside of the coolant outlet communication hole 45o along the other direction in the A direction, and is discharged from the fuel cell stack 3. The coolant, which is discharged from the fuel cell stack 3, passes through the inside of a coolant circulation flow passage (not illustrated), flows through a radiator, a drive motor, and the like, and is supplied to the fuel cell stack 3 again.

Here, the operation voltage detection device (not illustrated) is connected to the operation terminal portion 63 of the unit cell 2 as described above. According to this, a voltage of the unit cell 2 is detected. That is, the unit cell 2 of this embodiment has a configuration where two MEAs 24 and 25 are interposed between three separators 21 to 23, and thus the sum of voltages of the two MEAs 24 and 25 is detected. In addition, the power generation state of the fuel cell 1 is controlled on the basis of the voltage that is detected by the operation voltage detection device. According to this, various kinds of control are carried out.

Figure 5:
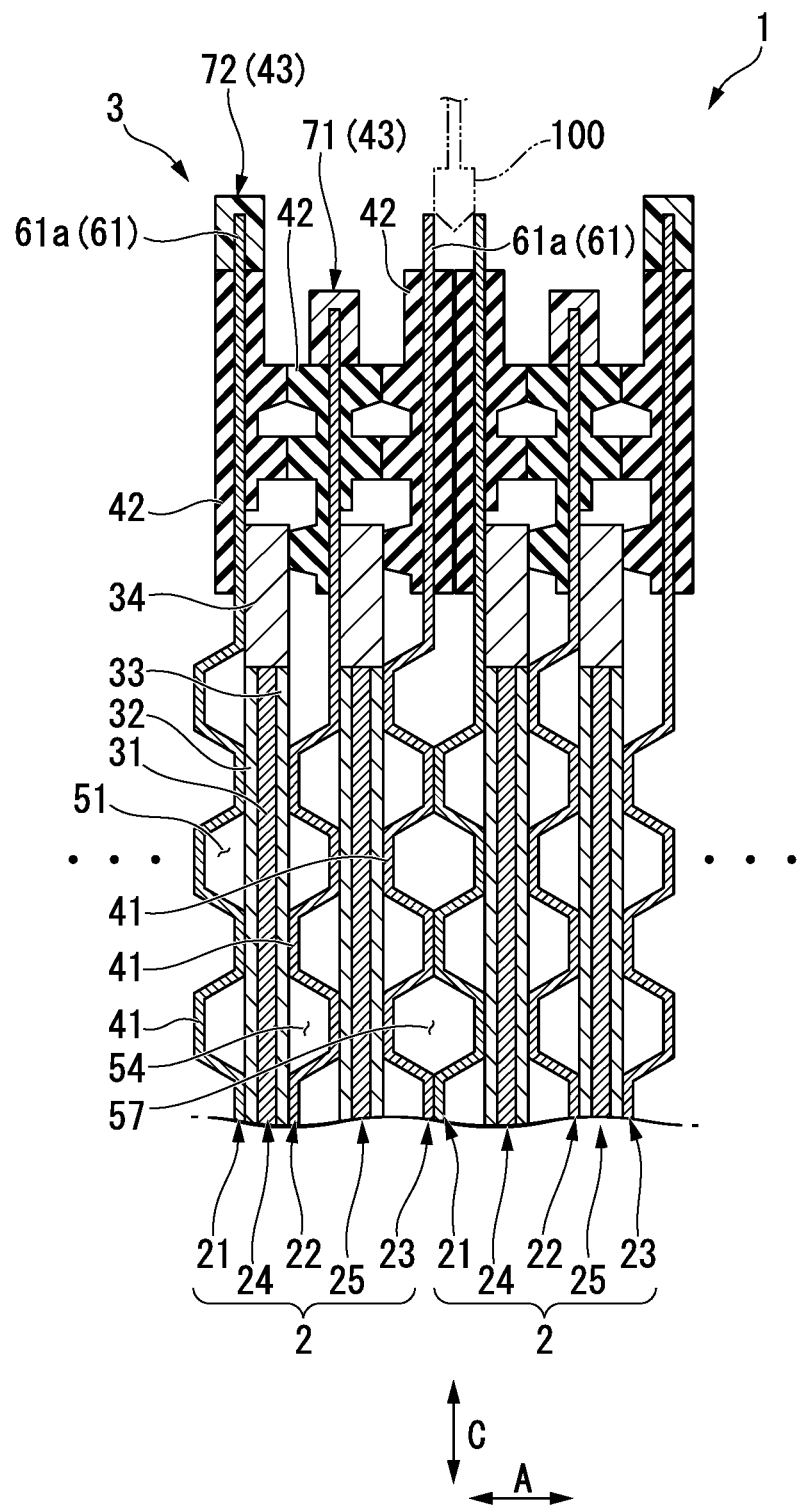
FIG. 5 is a cross-sectional view of the fuel cell which illustrates a state in which a terminal covering portion is removed.

FIG. 5 is a cross-sectional view of the fuel cell 1 which illustrates a state in which the terminal covering portion 72 is removed.

On the other hand, as illustrated in FIG. 5, in a case where it is necessary to detect a voltage for each of the MEA 24 and the MEA 25 during failure of the fuel cell 1 and the like, the terminal covering portion 72 is removed from the spare terminal portion 61. Specifically, in the terminal covering portion 72, a portion, which covers the offset portion 61b of the spare terminal portion 61, is gripped with a tool and the like, and the terminal covering portion 72 is pulled in a direction of being spaced away from the plate covering portion 71. In this case, the terminal covering portion 72 is fractured from the plate covering portion 71 through the weakened portion 74, and is peeled off from the spare terminal portion 61. According to this, the spare terminal portion 61 is exposed to the outside.

Then, a spare voltage detection device 100 is connected to the spare terminal portion 61 to detect a voltage of each of the MEA 24 and the MEA 25. Specifically, the spare voltage detection device 100 is inserted between the overlapping portion 61a of the spare terminal portion 61 of the first separator 21 in one of the unit cells 2, and the overlapping portion 61a of the spare terminal portion 61 of the third separator 23 in another one of the unit cells 2. Then, the spare voltage detection device 100 is brought into contact with both of the spare terminal portions 61. In addition, the first separator 21 of the one unit cell 2 and the third separator 23 of the another unit cell 2 come into electrical contact with each other, and thus the coolant flow passage 57 is defined between the one unit cell 2 and the another unit cell 2 as described above. According to this, a voltage between the spare terminal portion 61 of the first separator 21 in the one unit cell 2, and the spare terminal portion 61 of the third separator 23 in the another unit cell 2 becomes same. According to this, it is possible to detect a voltage of each of the MEA 24 and the MEA 25 by detecting a voltage between the separators 21 to 23 through the spare terminal portion 61 and the operation terminal portion 63. As a result, it is possible to specify an MEA 24 or an MEA 25 which failed.

As described above, in this embodiment, the terminal covering portion 72, which can be removed from the spare terminal portion 61, is formed integrally with the plate covering portion 71, and thus it is possible to achieve low cost, and it is possible to secure insulating properties of the spare terminal portion 61 during not in use.

Particularly, each of the spare terminal portions 61 includes the offset portion 61b that does not overlap an adjacent spare terminal portion 61 in a plan view when seen from the A direction, and thus it is possible to simply remove the terminal covering portion 72 from the spare terminal portion 61 through the offset portion 61b. As a result, it is possible to improve the maintenance properties.

In addition, the weakened portion 74 is formed between the terminal covering portion 72 and the plate covering portion 71, and thus it is possible to simply and reliably fracture only the terminal covering portion 72 from the plate covering portion 71. As a result, it is possible to improve the maintenance properties, and it is possible to suppress peeling-off of the plate covering portion 71 during removal of the terminal covering portion 72 from the spare terminal portion 61.

In addition, it is possible to detect a voltage between the spare terminal portions 61 (between the separators 21 and 23) only through insertion of the spare voltage detection device 100 between the spare terminal portions 61 during maintenance and the like, and thus it is possible to improve the maintenance properties.

In addition, each of the spare terminal portions 61 includes the overlapping portion 61a that overlaps the overlapping portion 61a of the adjacent spare terminal portion 61 in a plan view when seen from the A direction. Accordingly, when the spare voltage detection device 100 is inserted between the overlapping portions 61a, it is easy for the spare voltage detection device 100 to be brought into contact with both of the spare terminal portions 61. According to this, it is possible to achieve excellent workability.

In addition, even in a case where the unit cell 2 includes two MEAs 24 and 25, it is possible to detect a voltage of each of the MEA 24 and the MEA 25 through the spare terminal portion 61 of the separators 21 and 23 which are disposed on an outer side of the MEA 24 and the MEA 25 during maintenance and the like. According to this, it is possible to achieve a simple configuration, and it is possible to improve the maintenance properties.

In addition, in the separator plate 41 of the second separator 22, the operation terminal portion 63 is formed at a position that does not overlap the spare terminal portion 61 in a plan view when seen from the A direction, and thus it is possible to suppress interference with the spare terminal portion 61 during operation, and it is possible to connect the operation voltage detection device to the operation terminal portion 63. According to this, it is possible to accurately control the power generation state of the fuel cell 1. In addition, it is preferable that the exposed spare terminal portion 61 is filled with an insulating member after confirmation of the power generation state.

In the above-described embodiment, the unit cell 2 is set to have a configuration in which the unit cell 2 includes three separators 21 to 23, and two MEAs 24 and 25 are sandwiched between the separators 21 to 23, but there is no limitation thereto. Design change of the configuration of the unit cell 2 can be appropriately made as long as a voltage can be detected for each of the plurality of MEAs 24 and 25. For example, the unit cell 2 can be configured to include the MEA 24, the MEA 25, and pairs of separators sandwiching the MEA 24 and the MEA 25, respectively.

In addition, in the above-described embodiment, description has been given of a configuration in which the spare voltage detection device 100 is brought into contact with the spare terminal portion 61 of the first separator 21 in the one unit cell 2, and the spare terminal portion 61 of the third separator 23 in the another unit cell 2, but there is no limitation thereto. The spare voltage detection device 100 may be brought into contact with any one of the spare terminal portions 61.

In addition, in the above-described embodiment, description has been given of a configuration in which spare terminal portions 61 which are adjacent to each other include the overlapping portion 61a, but there is no limitation thereto. The spare terminal portions 61, which are adjacent to each other, may be disposed so as not to overlap each other.

In addition, the terminal covering portion 72 may be configured to be detachable from the spare terminal portion 61.

Figure 6:
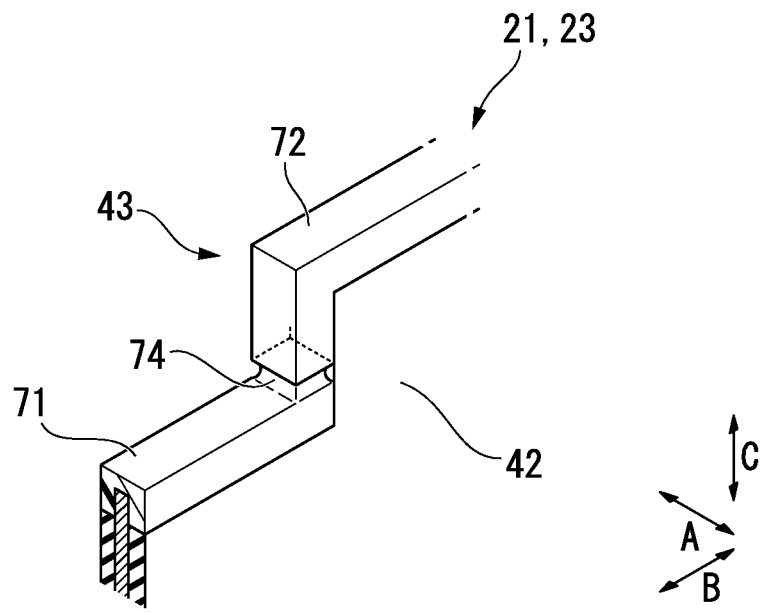
FIG. 6 is a partial perspective view illustrating another configuration of a separator plate.

In addition, in the above-described embodiment, description has been given of a case where the weakened portion 74 is formed only in an outer side end surface in the B direction at a boundary portion between the terminal covering portion 72 and the plate covering portion 71, but design change can be appropriately made with respect to a formation range of the weakened portion 74. For example, as illustrated in FIG. 6, at a boundary portion between the terminal covering portion 72 and the plate covering portion 71, the weakened portion 74 may be formed along the entire periphery.

Figure 7:
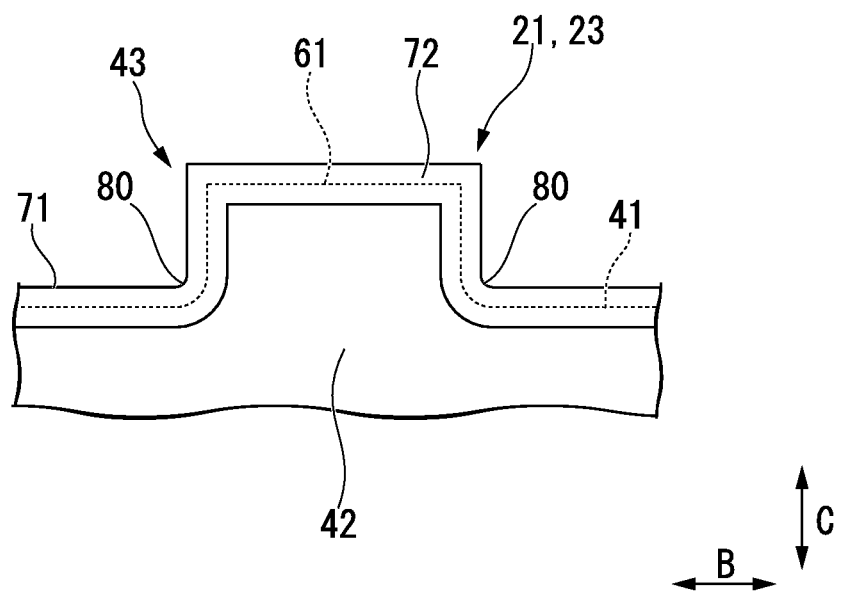
FIG. 7 is a plan view illustrating another configuration of the separator plate.

In addition, it is not necessary to provide the weakened portion 74 in the covering member 43 as long as the terminal covering portion 72 is configured to be fractured from the plate covering portion 71. For example, as illustrated in FIG. 7, in the covering member 43, a boundary portion 80 between the terminal covering portion 72 and the plate covering portion 71 may be formed in an arc shape that is convex toward an inward direction in the B direction. In this case, when pulling the terminal covering portion 72, the terminal covering portion 72 is fractured from the plate covering portion 71 starting from the vicinity of the boundary portion 80 between the terminal covering portion 72 and the plate covering portion 71. As a result, the same operation effect as in the above-described embodiment is exhibited. In addition, an arc shape, which is convex toward an inward direction in the B direction, may be formed at a boundary portion between the separator plate 41 and the spare terminal portion 61.

In the above-described embodiment, description has been given of a configuration in which the terminal covering portion 72 covers only the outer peripheral edge (both ends in the B direction, and an outer side end in the C direction) of the spare terminal portion 61, but there is no limitation thereto. For example, the entirety (both surfaces in the A direction in addition to the outer peripheral edge) of the spare terminal portion 61 may be covered with the terminal covering portion 72.

Figure 8:
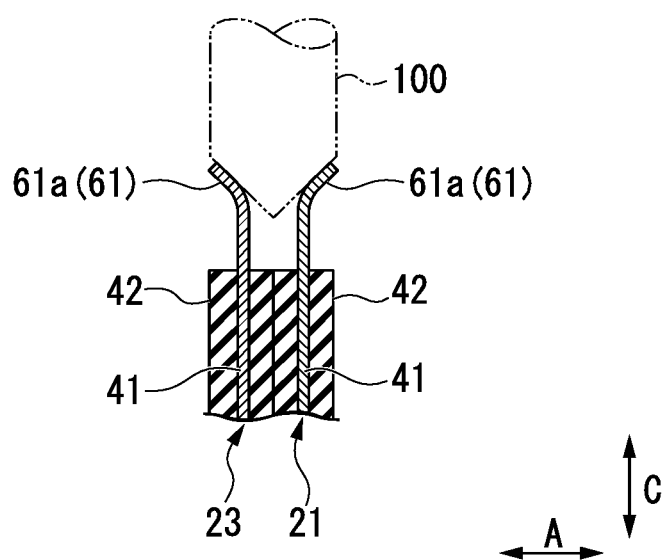
FIG. 8 is a partial cross-sectional view of the fuel cell which illustrates a state in which the terminal covering portion is removed.

In addition, as illustrated in FIG. 8, the spare terminal portion 61 may be configured to be elastically deformable in the A direction. According to this configuration, during insertion of the spare voltage detection device 100 between the spare terminal portions 61, the spare voltage detection device 100 enters between the spare terminal portions 61 while the spare terminal portions 61 are elastically deformed toward an outer side in the A direction. According to this, for example, in a case where a tip end surface of the spare voltage detection device 100 is formed in a tapered surface, the spare terminal portions 61 come into contact with the spare voltage detection device 100 along the tapered surface. As a result, a contact surface between the spare voltage detection device 100 and the spare terminal portion 61 increases, and thus adhesiveness therebetween is improved. According to this, it is possible to reduce contact resistance between the spare voltage detection device 100 and the spare terminal portion 61, and thus voltage detection accuracy is improved.

In addition, in a configuration of FIG. 8, dimensions of the spare terminal portion 61 (for example, the spare terminal portion 61 of the first separator 21 in one of the unit cells 2) are set so as not to come into contact with a spare terminal portion 61 (for example, the spare terminal portion 61 of the third separator 23 in the one unit cell 2) that is located on a side opposite to the spare voltage detection device 100 during elastic deformation. In addition, in the spare terminal portion 61, a shape of a portion that becomes a starting point of the elastic deformation can be appropriately changed. In addition, the spare terminal portion 61 may be formed in conformity to the shape (for example, a tapered shape) of the spare voltage detection device 100 in advance.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. A fuel cell comprising:
a plurality of stacked unit cells, each including a membrane-electrode assembly and a separator that is stacked on the membrane-electrode assembly,
wherein the separator includes,
a separator plate that overlaps the membrane-electrode assembly when seen from a stacking direction,
a first terminal portion configured to protrude from the separator plate toward an outer side in a direction perpendicular to the stacking direction, the first terminal portion having a distal end, a plate covering portion configured to cover an outer peripheral edge of the separator plate, and a terminal covering portion formed integrally with the plate covering portion and covering the distal end of the first terminal portion, and wherein a plurality of the first terminal portions, which are adjacent to each other in the stacking direction, include offset portions which shift from each other when seen from the stacking direction, and are covered with the terminal covering portion.

2. A fuel cell comprising:

a plurality of stacked unit cells, each including a membrane-electrode assembly and a separator that is stacked on the membrane-electrode assembly, wherein the separator comprises, a separator plate that overlaps the membrane-electrode assembly when seen from a stacking direction, a first terminal portion configured to protrude from the separator plate toward an outer side in a direction perpendicular to the stacking direction, the first terminal portion having a distal end, a plate covering portion configured to cover an outer peripheral edge of the separator plate, and a terminal covering portion formed integrally with the plate covering portion and covering the distal end of the first terminal portion, wherein a plurality of the first terminal portions, which are adjacent to each other in the stacking direction, include offset portions which shift from each other when seen from the stacking direction, and are covered with the terminal covering portion, and wherein a weakened portion, at which the terminal covering portion is capable of being fractured from the plate covering portion, is formed between the terminal covering portion and the plate covering portion.

3. The fuel cell according to claim 1, wherein each of the unit cells includes:

two external separators, two membrane-electrode assemblies which are disposed between the two external separators, and an intermediate separator that is disposed between the two membrane-electrode assemblies.

4. The fuel cell according to claim 3, wherein a coolant flow passage through which a coolant flows is defined between a separator of one of the unit cells and a separator of another one of the unit cells which is adjacent to the one unit cell, and the first terminal portion of the separator of the one unit cell, and the first terminal portion of the separator of the another unit cell partially overlap each other when seen from the stacking direction.

5. The fuel cell according to claim 3, wherein the intermediate separator is provided with a second terminal portion, which is exposed to an outer side, at a position not overlapping the first terminal portion of the separator when seen from the stacking direction.

6. The fuel cell according to claim 1, wherein a voltage detection device, which comes into contact with the plurality of first terminal portions adjacent to each other in the stacking direction and detects a voltage between the plurality of first terminal portions adjacent to each other in the stacking direction, is interposed between the plurality of first terminal portions adjacent to each other in the stacking direction.

7. A fuel cell comprising:

a plurality of stacked unit cells, each including a membrane-electrode assembly and a separator stacked on the membrane-electrode assembly, wherein the separator includes, a separator plate that overlaps the membrane-electrode assembly when seen from a stacking direction, a first terminal portion configured to protrude from the separator plate toward an outer side in a plane direction, a plate covering portion configured to cover an outer peripheral edge of the separator plate, and a terminal covering portion configured to be formed integrally with the plate covering portion and covers the first terminal portion, and a weakened portion, at which the terminal covering portion is capable of being fractured from the plate covering portion, is formed between the terminal covering portion and the plate covering portion.

* * * * *